United States Patent [19]
Burns et al.

[11] Patent Number: 5,518,789
[45] Date of Patent: May 21, 1996

[54] THIOETHER CONTAINING PHOTOPOLYMERIZABLE COMPOSITIONS

[75] Inventors: Elizabeth G. Burns; Susan A. Visser, both of Rochester; Jeffrey F. Taylor, Penfield, all of N.Y.

[73] Assignee: Eastman Kodak Company, Rochester, N.Y.

[21] Appl. No.: 243,882

[22] Filed: May 17, 1994

[51] Int. Cl.$^6$ .............................. B32B 3/02; B32B 15/08; B32B 27/00; C08F 16/30
[52] U.S. Cl. .................... 428/65.5; 428/66.6; 428/425.8; 428/461; 522/175; 522/180; 430/321
[58] Field of Search ............................ 428/64, 65, 425.8, 428/461; 522/175, 180, 182, 96, 103, 107, 167, 168; 430/321

[56] References Cited

U.S. PATENT DOCUMENTS

| | | | |
|---|---|---|---|
| 4,340,707 | 7/1982 | Qüis et al. | 522/180 |
| 4,931,521 | 6/1990 | Matsuda et al. | 526/286 |
| 5,008,129 | 4/1991 | Boling et al. | 427/160 |
| 5,091,440 | 2/1992 | Griswold | 522/172 |

FOREIGN PATENT DOCUMENTS

| | | |
|---|---|---|
| 04149280A | 10/1990 | Japan . |
| 05109118A | 10/1991 | Japan . |

*Primary Examiner*—Susan W. Berman
*Attorney, Agent, or Firm*—John R. Everett

[57] ABSTRACT

A photopolymerizable composition comprising a crosslinking agent, a UV sensitive photopolymerization initiator and a thioether compound having a vinyl ester or vinyl amide component; wherein the crosslinking agent and the thioether may be the same compound.

11 Claims, No Drawings

THIOETHER CONTAINING PHOTOPOLYMERIZABLE COMPOSITIONS

FIELD OF THE INVENTION

The present invention relates to photopolymerizable compositions and their use as protective layers in optical recording elements.

BACKGROUND OF THE INVENTION

Optical recording elements for storing information are known. Magneto optic and phase change elments and the currently popular compact disk or CD. Optical information is stored in the form of low specular reflectivity marks or pits on an otherwise reflective background.

One recently disclosed compact disk element is the so called "Photo CD". In this element, conventional photographic film is first processed in a conventional manner. Then, the images from the film are digitized and the digital information is recorded in a CD readable form on an optical recording material. Images can then be played back by means of a CD type player on a conventional television.

A typical Photo CD structure contains a substrate that is successively overcoated with an optical recording layer, a metal reflective layer, and one or more protective layers. The protective layers are typically photopolymerizable or UV-curable compositions designed to protect the underlying layers from physical damage and/or loss of recorded information.

Gold and aluminum are commonly used as the metal reflective layer in optical disks. Gold is preferred in some applications because it is more reflective than aluminum. However, gold is also a notoriously difficult surface for achieving adequate polymer/metal adhesion. Current photopolymerizable compositions of which we are aware form protective layers that exhibit poor adhesion to gold. Poor protective layer adhesion to gold significantly decreases the ability of a protective layer to protect the metal reflective layer.

SUMMARY OF THE INVENTION

The present invention provides a photopolymerizable composition comprising a crosslinking agent, a UV sensitive photopolymerization initiator and a thioether compound having a vinyl ester or vinyl amide component; wherein the crosslinking agent and the thioether may be the same compound.

When the composition is spin coated onto a metal layer and then photopolymerized by exposure to, for example UV radiation, the invention further provides a protective layer for optical recording elements of the type discussed hereinbefore.

The observed increase in adhesion of the protective layers to gold is due to the presence of the thioether functional group in the compound. Any such compound will improve the adhesion of the protective layers to metal reflective layers relative to the prior art.

The utility of thioether compounds in improving lacquer adhesion to metal is demonstrated in the examples for formulations comprising acrylated urethane oligomers, acrylated epoxy oligomers, acrylic oligomers, and acrylated amines. The examples demonstrate that thioethers improve adhesion regardless of the chemical composition of the other components of the photopolymerizable compositions of this invention. The presence of different monomer types with differing numbers of photopolymerizable groups and at different ratios in the examples also demonstrates the broad applicability of the thioethers for improving adhesion to metal layers.

DETAILS OF THE INVENTION

The compositions of the invention comprise from 0.25 to 25 weight percent photo-polymerization initiator; from 2 to 95 weight percent crosslinking agent and 0.5 to 95 weight percent of the thioether compound.

In compositions where the thioether compound also includes components that serve the cross-linking function the composition comprises from 0.25 to 25 weight percent photopolymerization initiator and 0.5 to 99 weight percent of the thioether compound.

Useful compositions can also comprise from 1 to 10 weight percent photopolymerization initiator; from 2 to 50 weight percent crosslinking agent and 2 to 80 weight percent of the thioether compound.

The compositions improve adherence togold, aluminum, copper, silver, nickel, chrome, titanium, cobalt, palladium, tin and alloys comprising such metals

Thioether Compounds

Useful thioether compounds include any polymerizable compound in which a sulfur atom is bonded between two carbon atoms. Such compounds include thiophenes, thiazoles, thioether acrylates, thioether methacrylates, thioether acrylamides and thioether methacrylamides, thioether diacrylates, thioether dimethacrylates, thioether diacrylamides and thioether dimethacrylamides.

Structure I, below, provides a further clarification of useful thioether compounds.

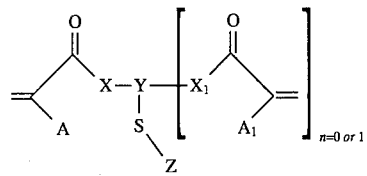

A and $A_1$, each independently, represent H or branched or straight-chain $C_1$-$C_{10}$ alkyl;

X and $X_1$, each independently, represent NH or O;

Y represents a branched or straight-chain $C_1$-$C_{20}$ alkylene, alkenylene or alkynylene; substituted or unsubstituted $C_6$-$C_{30}$ aromatic groups or substituted or unsubstituted heterocyclic groups having 5 to 30 atoms;

S is a sulfur atom; and

Z represents a branched or straight-chain $C_1$-$C_{20}$ alkyl, alkenyl or alkynyl; substituted or unsubstituted $C_6$-$C_{30}$ aromatic groups or substituted or unsubstituted heterocyclic having 5 to 30 atoms; or Y, S and Z may be taken together to form a substituted or unsubstituted heterocylic group containing from 5 to 8 atoms.

The term heterocylic includes saturated or unsaturated heterocyclic groups.

Particularly useful thioethers within structure I include compounds in which:

A and A1, each independently, represent hydrogen, methyl, ethyl, propyl or butyl;

Y represents methylene; ethylene; propylene; 1-methyl pentylene; 1,2-dimethyloctylene; 1,1-dimethylpropylene; 2-methlethylene; 4,4-dimethybutylene; hexylene; 2-ethylethylene; 3-butylpropylene; 5,5-butylhexylpentylene; 1,1-ethylbutylhexadecylene; methylenecyclobutylene; propylene-1,3-cyclopentylene;

methylene-1,4-cyclohexylene; propylene-1,3-cyclohexylene; 21-trieicosynylene; 4,5-heptadienylene; 1-(-2-hexenyl)propylene; 3-3-(cyclohex-3-enyl)propylpropylene; pentadecylene; 3-2-(m-ethylphenyl)ethylhexylene; hexylene-1,4-phenyleneethylene; butylene; methylene-1,7-naphthylenepropylene; methylene-1,3-pyridenyleneethylene; eicosanylene; 2,5-thiophenylene; 2-pentenylene; 4-methyl-5-decylhept-4enylene; dodecylene; 8,11,14,17,20-pentaoxodoeicosanylene; and 9-isobornyldecylene;

Z represents methyl; ethyl; propyl; butyl; pentyl; 1,1-dimethylpropyl; 2-methylpropyl; cycloheptyl; 5-cyclohexylpentylene; 3-butylcyclopentyl; methylene-2propylcyclohexyl; 21-cycloundecyltrieicosyl; cyclohexyl; 2,6,10,14,18,22,26,30,34,38-tetraminoditetracontyl; 3-decenyl; z-3-methyl-4-ethyltetradec-3-enyl; 5-heptynyl; 3-butynyl; 2-pentenyl; 1-ethyl-3-dicyclopentadienepropylene; 3-hexyl-4-isopropylphenylenebutylene; phenylpropylene; methylenenathphyl; dodecyl; methylene-2,5-pyridenylenepropyl; 4-pyridenylbutylene; 2-furanylethylene; methylene-2,5-pyrrolylenepropyl; 3-butenylene; 2-propyl-prop-2-enyl; 2-hexahydroindanylethylene; or Y, Z and S, taken together represent methylene-1,2-(4-sulfacyclopentylene)propyl; propylene-4-sulfacyclopentyl; 2-sulfa-5-oxocycloheptane; ethylene-1,3-(2-oxo-3-sulfa)cylohexylenehexane; methylene-1,5-(3-sulfa-6-aminocyloocylene)propane; heptylene-4-sulfacylcopent-1-ene; methylene-4-sulfa-2-aminocyclopent-1-ene; propylene-1,2-(4-sulfacyclopent-1-ene)ethane.

Tables 1 and 2 present specific representative examples of useful thioether compounds.

TABLE 1 n = 0

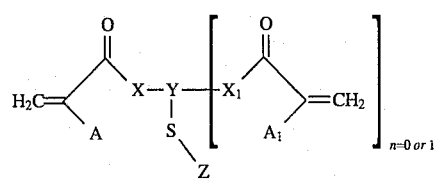

No.

1

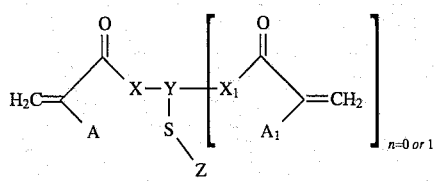

2

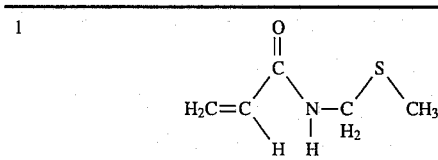

TABLE 1-continued n = 0

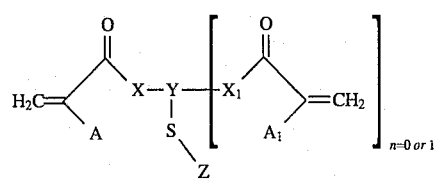

No.

3

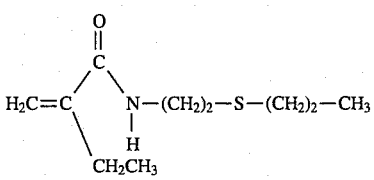

4

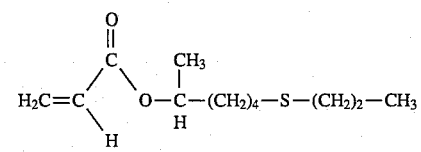

5

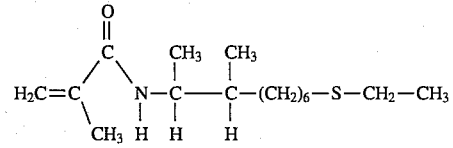

6

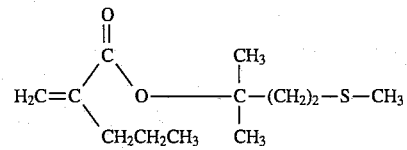

7

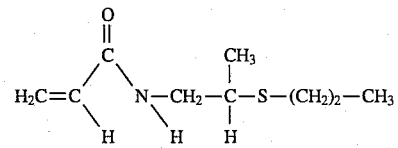

8

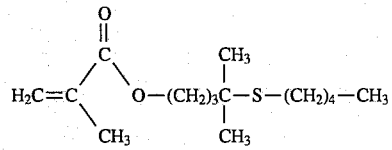

9

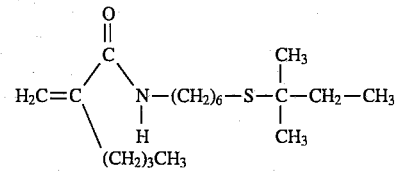

10

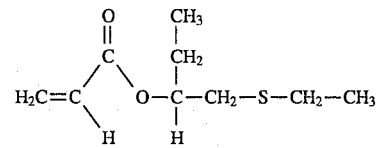

TABLE 1-continued n = 0

[structure: H₂C=C(A)-C(=O)-X-Y(S-Z)-[X₁-C(=O)-C(A₁)=CH₂]ₙ₌₀ ₒᵣ ₁]

| No. | |
|---|---|
| 11 | H₂C=C(CH₃)-C(=O)-N(H)-(CH₂)₂-C(H)(((CH₂)₃-CH₃))-S-(CH₂)₃-CH₃ (with (CH₂)₃ branch with CH₃) |
| 12 | H₂C=C(CH₂CH₃)-C(=O)-O-(CH₂)₄-C((CH₂)₃-CH₃)((CH₂)₅-CH₃)-S-(CH₂)₂-CH₃ |
| 13 | H₂C=CH-C(=O)-N(H)-C(H)((CH₂)₃CH₃)-(CH₂)₁₅-S-CH₂-CH₃ with CH₂CH₃ branch |
| 14 | H₂C=C(CH₃)-C(=O)-O-(CH₂)₂-S-CH₂-CH(CH₃)-CH₃ |
| 15 | H₂C=CH-C(=O)-O-CH₂-(cyclobutyl)-S-(CH₂)₂-CH₃ |
| 16 | H₂C=C(CH₃)-C(=O)-N(H)-(CH₂)₃-(cyclopentyl)-S-(CH₂)₄-CH₃ |
| 17 | H₂C=C(CH₂CH₂CH₃)-C(=O)-O-CH₂-(cyclohexyl)-S-(CH₂)₂-CH₃ |
| 18 | H₂C=CH-C(=O)-N(H)-(CH₂)₃-(cyclohexyl)-S-CH₂-CH₃ |
| 19 | H₂C=C(CH₃)-C(=O)-O-(CH₂)₂-S-(cycloheptyl) |
| 20 | H₂C=C(CH₂CH₂CH₃)-C(=O)-N(H)-(CH₂)₃-S-(CH₂)₅-(cyclohexyl) |
| 21 | H₂C=CH-C(=O)-O-CH₂-(tetrahydrothiophene ring with (CH₂)₂-CH₃ substituent) |
| 22 | H₂C=CH-C(=O)-O-(CH₂)₂-S-(cyclopentyl)-(CH₂)₃-CH₃ |
| 23 | H₂C=C(CH₂CH₃)-C(=O)-N(H)-(CH₂)₁₅-S-CH₂-(cyclohexyl)-(CH₂)₂-CH₃ |
| 24 | H₂C=C(CH₃)-C(=O)-O-(CH₂)₃-(thiacyclooctane ring) |
| 25 | H₂C=CH-C(=O)-N(H)-(CH₂)₈-C(H)(norbornyl)-CH₂-S-(CH₂)₂-CH₃ |
| 26 | H₂C=CH-C(=O)-O-(CH₂)₃-S-(CH₂)₂₀-C(H)(cyclododecyl-11)(CH₂CH₂CH₂CH₃)-CH₂-CH₃ |

TABLE 1-continued
n = 0
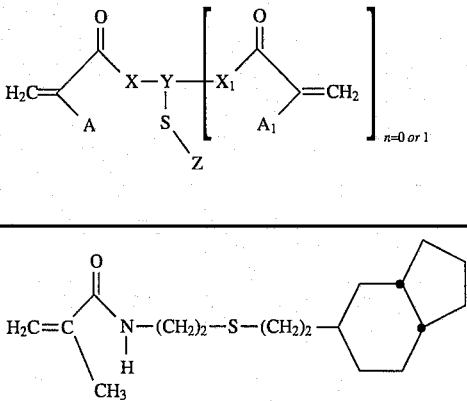
| No. | | No. | |
|---|---|---|---|
| 27 | 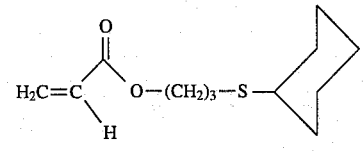 | 35 | 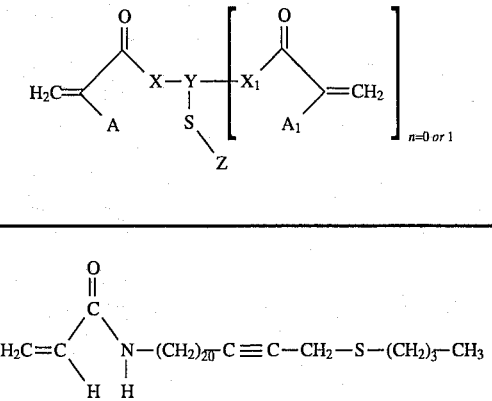 |
| 28 | 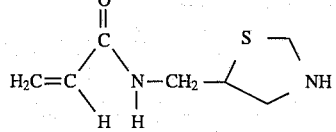 | 36 | 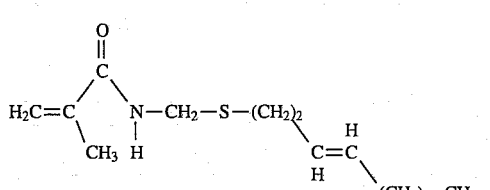 |
| 29 | 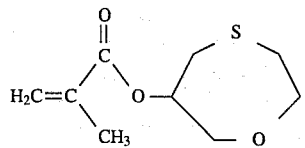 | 37 | 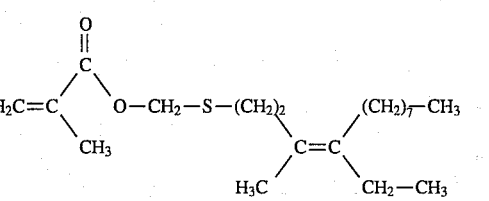 |
| 30 | 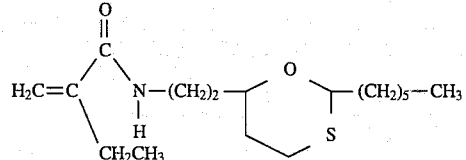 | 38 | 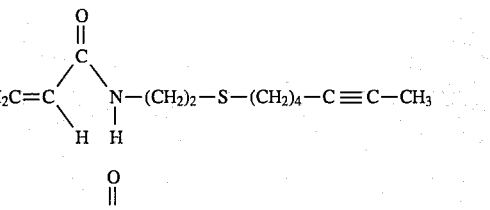 |
| 31 | 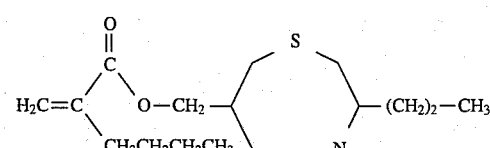 | 39 | 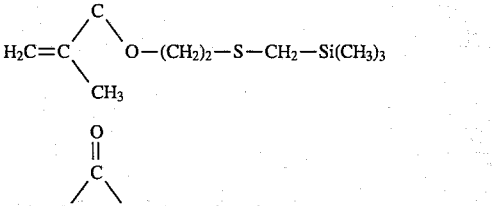 |
| 32 | 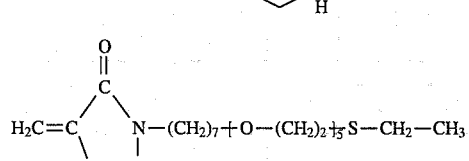 | 40 | 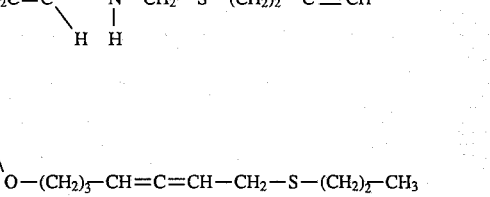 |
| 33 | 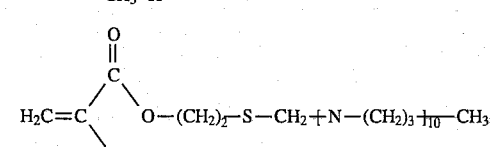 | 41 | 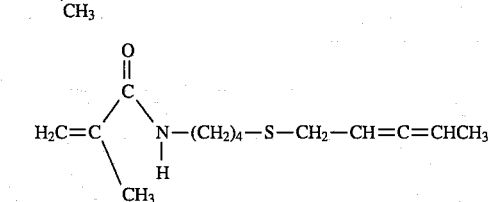 |
| 34 | | 42 |  |

TABLE 1-continued n = 0

$$\underset{A}{H_2C=C}-\underset{}{\overset{O}{\overset{\|}{C}}}-X-Y-\left[\underset{\overset{|}{S}}{\overset{}{}}\underset{A_1}{X_1}-\overset{O}{\overset{\|}{C}}-C=CH_2\right]_{n=0\,or\,1}$$

| No. | |
|---|---|
| 43 | H₂C=C(CH₃)–C(O)–O–CH(CH₂–CH=CH–(CH₂)₂–CH₃)–(CH₂)₂–S–(CH₂)₅–CH₃ |
| 44 | H₂C=CH–C(O)–NH–(CH₂)₇–CH=CH– (tetrahydrothiophene ring, H₂C–S–CH₂) |
| 45 | H₂C=CH–C(O)–O–CH₂–CH=N– (thiazoline ring, H₂C–S–CH₂) |
| 46 | H₂C=CH–C(O)–NH–(CH₂)₃–CH=CH–CH₂–CH₃ (tetrahydrothiophene ring, H₂C–S–CH₂) |
| 47 | H₂C=CH–C(O)–O–(CH₂)₂–CH(–(CH₂)₃–cyclohexenyl)–S–CH₂–CH₃ |
| 48 | H₂C=CH–C(O)–NH–(CH₂)₁₅–S–CH(–(CH₂)₂–cyclopentadienyl)–CH₂–CH₃ |
| 49 | H₂C=C(CH₃)–C(O)–O–(CH₂)₂–S–(CH₂)₂–CH(CH₂–C₆H₄–CH(CH₃)₂)–(CH₂)₅–CH₃ |
| 50 | H₂C=C(CH₃)–C(O)–NH–(CH₂)₂–CH(–(CH₂)₂–C₆H₄–CH₂CH₃)–(CH₂)₃–S–CH₃ |
| 51 | H₂C=C(CH₃)–C(O)–O–(CH₂)₆–C₆H₄–CH₂–S–CH₃ (mixture of isomers) |
| 52 | H₂C=CH–C(O)–NH–(CH₂)₂–S–(CH₂)₃–C₆H₅ |
| 53 | H₂C=CH–C(O)–O–(CH₂)₄–S–CH₂–(2-naphthyl) |
| 54 | H₂C=C(CH₃)–C(O)–O–CH₂–(naphthyl with –(CH₂)₃–S–CH₃ substituent) |
| 55 | H₂C=C(CH₃)–C(O)–O–CH₂–(pyridyl with –(CH₂)₂–S–(CH₂)₁₁–CH₃ substituent) |

TABLE 1-continued
n = 0
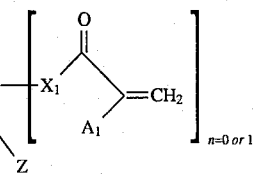
| No. | |
|---|---|
| 56 | 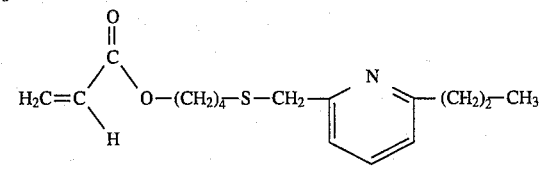 |
| 57 | 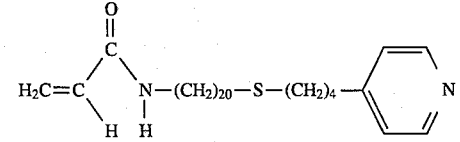 |
| 58 | 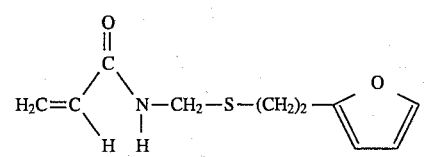 |
| 59 | 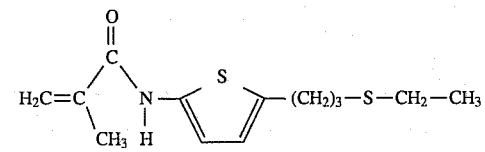 |
| 60 | 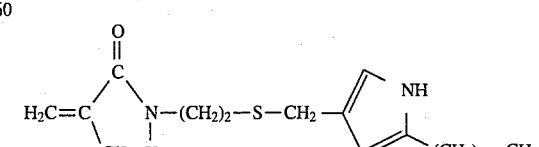 |
| 61 | 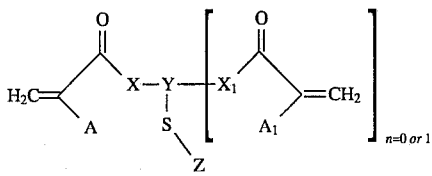 |
| 62 | 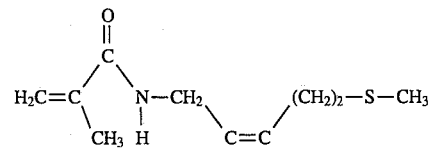 |
| 63 | 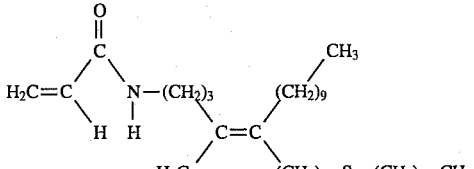 |
| 64 | 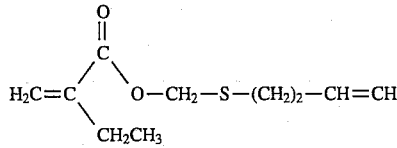 |
TABLE 2
n = 1
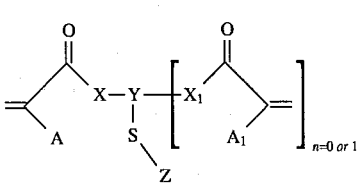
I
| | A | A' | X | X' | Y | Z |
|---|---|---|---|---|---|---|
| II-1 | H | H | O | O | —CH$_2$—CH—CH$_2$— | —CH$_3$ |

TABLE 2-continued n = 1

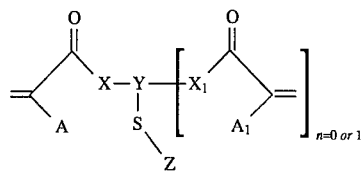

I

|      | A        | A'       | X  | X' | Y | Z |
|------|----------|----------|----|-----|---|---|
| II-2 | $CH_3$ | $CH_3$ | NH | NH |   | $-CH_3$ |
| II-3 | $CH_2CH_3$ | $CH_2CH_3$ | O | NH | $-CH_2-CH_2-\underset{\underset{\|}{\|}}{\overset{OCH_3}{C}}-CH_2-$ | $-CH_3$ |
| II-4 | H | H | NH | O | tetrahydrofuran-diyl with ethyl substituent | $-CH_3$ |
| II-5 | $CH_3$ | $CH_3$ | O | O | 1,3,5-benzene-tri(methylene) | $-CH_3$ |
| II-6 | $CH_2CH_3$ | $CH_2CH_3$ | NH | NH | $-CH_2-CH-CH_2-$ with p-phenylene | $-CH_3$ |
| II-7 | H | H | O | NH | $-CH_2-CH-CH_2-$ | $-CH(CH_3)_2$ |
| II-8 | $CH_3$ | $CH_3$ | NH | O | $-CH_2-\underset{\underset{CH_2CH_3}{\|}}{\overset{CH_3}{C}}-CH_2-CH_2-$ | $-CH(CH_3)_2$ |
| II-9 | $CH_2CH_3$ | $CH_2CH_3$ | O | O | $-CH_2-CH_2-\underset{\underset{\|}{\|}}{\overset{OCH_3}{C}}-CH_2-$ | $-CH(CH_3)_2$ |
| II-10 | H | H | NH | NH | tetrahydrofuran-diyl with ethyl substituent | $-CH(CH_3)_2$ |

TABLE 2-continued n = 1

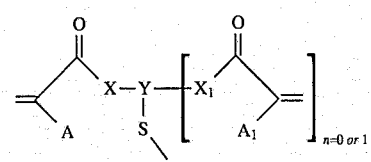

I

|  | A | A' | X | X' | Y | Z |
|---|---|---|---|---|---|---|
| II-11 | CH$_3$ | CH$_3$ | O | NH | 3,5-(CH$_2$)-phenyl | -CH(CH$_3$)$_2$ |
| II-12 | CH$_2$CH$_3$ | CH$_2$CH$_3$ | NH | O | -CH$_2$-C$_6$H$_4$-CH$_2$- (para) | -CH(CH$_3$)$_2$ |
| II-13 | H | H | O | O | -CH$_2$-CH(-)-CH$_2$- | 2,4-(CH$_3$)$_2$-phenyl |
| II-14 | CH$_3$ | CH$_3$ | NH | NH | -CH$_2$-C(CH$_3$)(CH$_2$CH$_3$)-CH$_2$-CH$_2$- | 2,4-(CH$_3$)$_2$-phenyl |
| II-15 | CH$_2$CH$_3$ | CH$_2$CH$_3$ | O | NH | -CH$_2$-CH$_2$-C(OCH$_3$)(-)-CH$_2$- | 2,4-(CH$_3$)$_2$-phenyl |
| II-16 | H | H | NH | O | tetrahydrofuran-2,5-diyl with CH$_2$CH$_3$ substituent | 2,4-(CH$_3$)$_2$-phenyl |
| II-17 | CH$_3$ | CH$_3$ | O | O | 3,5-(CH$_2$)-phenyl | 2,4-(CH$_3$)$_2$-phenyl |

TABLE 2-continued n = 1

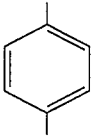

I

| | A | A' | X | X' | Y | Z |
|---|---|---|---|---|---|---|
| II-18 | CH₂CH₃ | CH₂CH₃ | NH | NH | —CH₂—CH—CH₂— (with p-phenylene) | 3,5-dimethylphenyl |
| II-19 | H | H | O | NH | —CH₂—CH—CH₂— | —CH₂—CH₂—SO₃H |
| II-20 | CH₃ | CH₃ | NH | O | —CH₂—C(CH₃)(CH₂CH₂—)—CH₂—CH₂— | —CH₂—CH₂—SO₃H |
| II-21 | CH₂CH₃ | CH₂CH₃ | O | O | —CH₂—CH₂—C(OCH₃)—CH₂— | —CH₂—CH₂—SO₃H |
| II-22 | H | H | NH | NH | tetrahydrofuran-diyl with CH₂CH₂ | —CH₂—CH₂—SO₃H |
| II-23 | CH₃ | CH₃ | O | NH | 3,5-disubstituted phenyl-CH₂— | —CH₂—CH₂—SO₃H |
| II-24 | CH₂CH₃ | CH₂CH₃ | NH | O | —CH₂—CH—CH₂— (with p-phenylene) | —CH₂—CH₂—SO₃H |
| II-25 | H | H | O | O | —CH₂—CH—CH₂— | cyclohexyl |

TABLE 2-continued
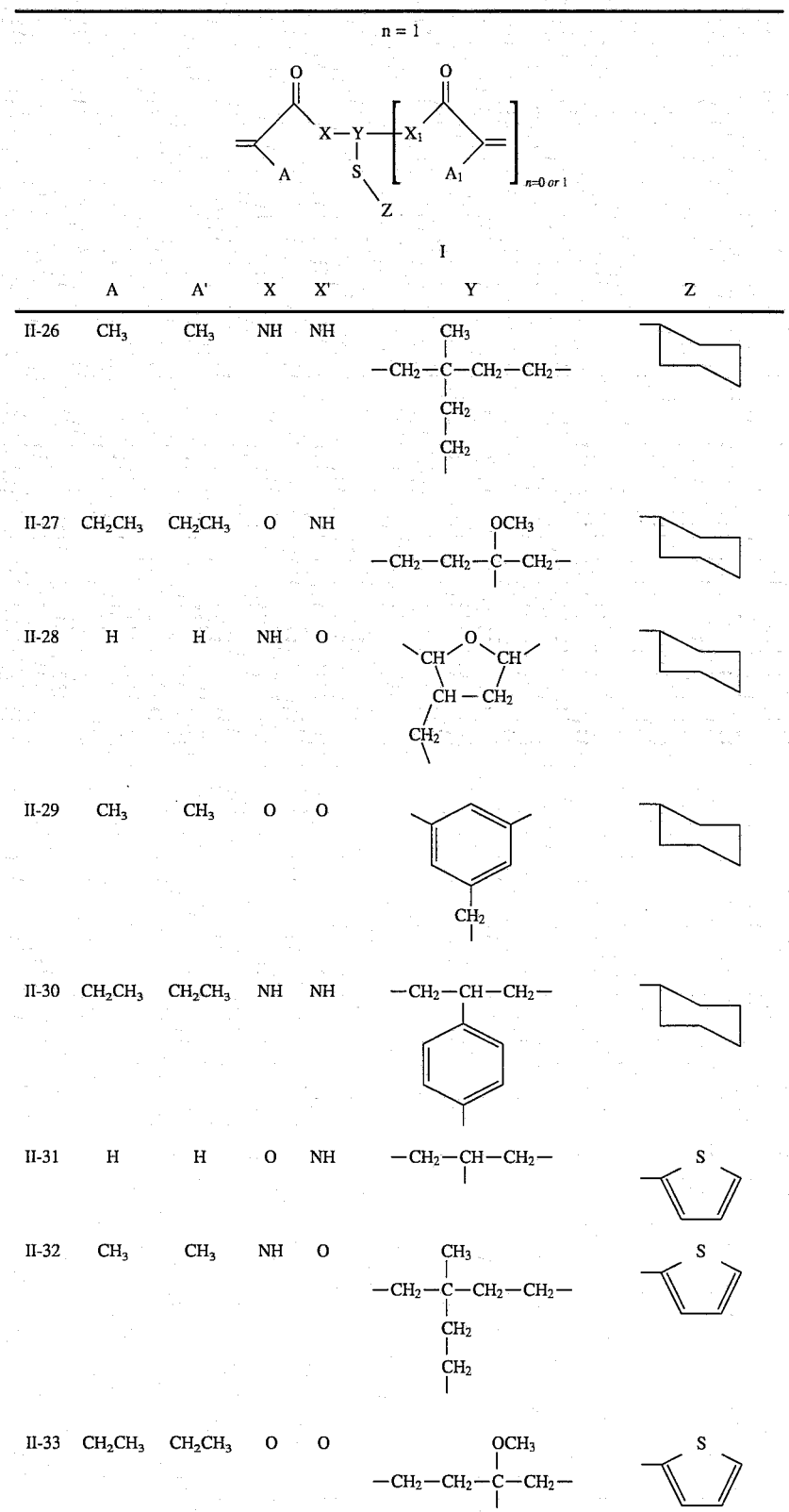

TABLE 2-continued n = 1

$$\text{structure I: }\underset{A}{\overset{O}{\diagdown}}\!\!\!\!\!\!=\!\!\!\!\!\!\underset{A}{\overset{\|}{C}}\!-\!X\!-\!Y\!\!\underset{S\diagdown Z}{\phantom{X}}\!\!\!\left[\!-X_1\!-\!\underset{A_1}{\overset{O}{\underset{\|}{C}}}\!\!\!=\!\!\!\right]_{n=0\,or\,1}$$

I

| | A | A' | X | X' | Y | Z |
|---|---|---|---|---|---|---|
| II-34 | H | H | NH | NH | CH–O–CH / CH–CH₂ / CH₂ (tetrahydrofuran ring with CH₂ branch) | S (thiophene) |
| II-35 | CH₃ | CH₃ | O | NH | 1,3,5-trisubstituted benzene with CH₂ | S (thiophene) |
| II-36 | CH₂CH₃ | CH₂CH₃ | NH | O | —CH₂—CH—CH₂— (with p-phenyl) | S (thiophene) |

Thioether acrylates, methacrylates, acrylamides, methacrylamides etc. can be made by techniques well known in the art, i.e., reaction of a thioether alcohol or amine with an acrylic, methacrylic etc. acid chloride, acid anhydride or acid ester or amide, where the ester or amide is a known leaving group e.g. imidazole or p-nitrophenol. The solvents, bases and reaction conditions for these reactions are well known in the art, and are taught in text books on organic chemistry, for instance, Streitwieser, A. Jr. and Heathcock, C. H. *Introduction to Organic Chemistry*, 2nd Edition, New York: Macmillan, 1981 and Ege, S. *Organic Chemistry*, Lexington, Mass.: Heath, 1984. Thioether alcohols and amines are made by techniques well known to those skilled in the art; these techniques have been described in textbooks, monographs and journal articles, including 1) Patai, S. *The Chemistry of the Ether Linkage*, chapters 12 & 13, New York: Interscience, 1967. 2) Gronowitz, *Thiophene and Its Derivatives, Part One*, New York: Wiley, 3) Greidlina, R. Kh. and Skorova, A. E. *Organic Sulfur Chemistry* New York: Pergamon, 1981. 4) Breslow, D. S. and Skolnik, H. *Multi-Sulfur and Sulfur and Oxygen Five- and Six-Membered Heterocycles Part Two* New York: Interscience, 1966. 6) Metzger, J. V. *Thiazole and Its Derivatives* New York: Wiley. 7) Rosowsky, A. *Seven-Membered Heterocyclic Compounds Containing Oxygen and Sulfur* New York: Wiley Interscience. 8) Bambas, L. L. *Five-Membered Heterocyclic Compounds with Nitrogen and Sulfur or Nitrogen, Sulfur and Oxygen (Except Thiazole)* New York: Interscience, 1952. 9) Hartough, H. D. *Thiophene and Its Derivatives* New York: Interscience, 1952. 10) Patai, S. editor *The Chemistry of Functional Groups, Supplement E: The Chemistry of Ethers, Crown Ethers, Hydroxyl Groups and Their Sulfur Analogs* New York: Wiley, 1980.

Photoinitiators

Photoinitiators are well known. Useful photoinitiators include acetophenone, 2,2-diethoxyacetophenone, p-dimethylaminoacetophenone, p-dimethylaminopropiophenone, benzophenone, 2-chlorobenzophenone, p,p'dichlorobenzophenone, p,p'-bisdiethylaminobenzophenone, Michler's ketone, benzyl, benzoin, benzoinmethylether, benzoinethylether, benzoinisopropylether, benzoin-n-propylether, benzoinisobutylether, benzoin-n-butylether, benzylmethylketal, tetramethylthiuram-monosulphide, thioxanthone, 2-chlorothioxanthone, 2-methylthioxanthone, azobisisobutylonitrile, benzoinperoxide, di-tert-butylperoxide, p-isopropyl-alpha-hydroxyisobutylphenone, alpha-hydroxyisobutylphenone, dibenzosuberone, diethylthioxanthone, 2,2-dimethoxy-2-phenyl acetophenone and the like. The photoinitiator used in the examples is Darocur 1173 (Ciba-Geigy) having the name 2-hydroxy-2-methyl-1-phenyl-1-propanone and the structure:

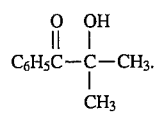

Crosslinking Agents

The crosslinking agent has more than one photopolymerizable group. Its concentration in the composition is dependent, in part, upon the number of such groups in the agent. Those skilled in the art are able to adjust concentrations in view of such factor.

Crosslinking agents include polyfunctional monomers such as 1,3-propanediol diacrylate, 1,3 butanediol diacrylate, 1,6-hexanediol diacrylate, 1,10-decanediol diacrylate, diethyleneglycol diacrylate, triethyleneglycol diacrylate, tetraethyleneglycol diacrylate, tripropyleneglycol diacrylate, polyethyleneglycol diacrylate, neopentylglycol diacrylate, hydroxypivalic acid ester, neopentylglycol diacrylate, trimethylolpropane diacrylate, bisoxyethylenized bisphenol A diacrylate, bisdi(oxyethylenized)bisphenol A diacrylate, bisoxypropylenized bisphenol A diacrylate, bisdi(oxypropylenized)bis-phenol A diacrylate, 3-methylpentanediol diacrylate, bisacryloyloxyethyloxymethyl tricyclodecane, and their corresponding dimethacrylates; triacrylates and trimethacrylates such as trimethylolpropane triacrylate, pentaerythritol triacrylate and their corresponding trimethacrylates, and tris(2-hydroxyethyl)isocyanate; acrylates and methacrylates having four or more reactive groups such as dipentaerythritol hexa-acrylate, tetramethylolmethane tetraacrylate and pentaerythritol tetra-acrylate, and their corresponding methacrylates; and the like. Other well known crosslinking agents are included within the scope of the invention.

The range of protective coating properties can be considerable expanded and controlled through addition of oligomers into the compositions of the inventions. We have included a sampling of the types of oligomers that might be of interest in the examples. Other useful acrylate oligomers are commercially available from a variety of sources such as the Sartomer Company.

Adhesion of the protective coating formed on the metallic layers in optical recording element is determined using the following peel test. This test is a version of the 90° peel test taken from Adhesion and Adhesives, Science and Technology (1990). In the test the composition is spin coated and UV cured on a gold coated substrate. A strip of Scotch tape (¾ inch wide, 3M brand #810) is placed radially along the disk on the surface of the layer with an excess of at least 40 mm extending past the outside diameter of the disk. Using a razor blade, the layer is cut at the edge of the tape to insure that when the portion of layer under the tape is peeled, it is removed without breaking from the surrounding layer. The entire disk is clamped to a stage of an Instron Tensile testing apparatus. This stage is capable of moving vertical and horizontal. Vertical movement is controlled by an Instron tensile testing apparatus, and will be used to peel the layer from the coating. The horizontal movement is controlled by the operator, and used to keep the peel angle at 90°. The excess tape or leader is clamped to a load cell. The distance of the upper clamp from the disk is 40 mm. The stage is lowered at a rate of 1 inch (2.54 cm) per minute. The peel force is taken as the average measured force to peel the layer from the gold coated substrate per tape width.

Other Addenda

As is well known stabilizers or other additives may be present to, for example, prevent premature curing or improve substrate wetting of the uncured systems, plasticizer, defoamers, etc.

Optical Recording Elements

The optical recording elements provided by the invention includes elements such as phase change elements, magneto optic elements and compact disks. Both phase change elements and magneto optic elements have metal recording layers. Compact disk elements, such as Kodak's Photo CD elements, have dye recording layers. All of these elements use protective layers.

To illustrate the invention we use a Photo CD element. It comprises a light transmitting, typically pregrooved substrate, with the metallized azo-ether dye recording layer overlaying the substrate and a light reflective layer overlaying the light absorptive layer. A protective layer overlays the light reflective layer. The preferred embodiment is that of a writable compact disc (CD). The write and read lasers are of the laser diode type and operate in the infrared region between 770 and 830 nm. The element can have prerecorded ROM areas as described in U.S. Pat. No. 4,940,618. The surface of the substrate can have a separate heat deformable layer as described in U.S. Pat. No. 4,990,388. Other patents relating to recordable CD type elements are U.S. Pat. Nos. 5,009,818; 5,080,946; 5,090,009; 4,577,291; 5,075,147; and 5,079,135.

Recording is accomplished by focusing an information (alphanumeric or image) modified laser beam on the dye recording layer. The result causes a pattern of change in the specular reflectivity of the element. This pattern constitutes the recorded information. This pattern, when scanned by the read laser, is seen as a pattern of reflectivity modulation that is converted back into the recorded information by playback electronics. For the preferred CD format, information is written with a diode laser emitting between 775 and 800 nm and read with a diode laser emitting between 775 and 800 nm. Such dyes are well known in the optical recording art. With the CD format, metallized azo-ether dyes can be selected so that the real part of the complex refractive index (N) of the unwritten light absorptive layer measured with 788 nm light source is not less than 1.8 and the imaginary part (k) is not greater than 0.15. For example metallized azo-ether dyes (disclosed in U.S. patent application Ser. No. 08/140,641 by Hapman et al)or with other dye or dyes or with addenda.

The substrate may be any transparent material that satisfies the mechanical and optical requirements. Generally, the substrate is pregrooved with groove depths from 20 nm to 250 nm, groove widths 0.2 to 1 µm and a pitch of 1 to 2 µm. The preferred material is polycarbonate. Other useful materials include glass, polymethylmethacrylate and other suitable polymeric materials.

The preparation of the optical recording element of the invention is achieved by spin coating a dye from a suitable solvent onto a transparent substrate to form a recording layer. The dye recording layer of the element is then overcoated with a metal reflective layer under reduced pressure by resistive heating or a sputter method and finally overcoated with a protective resin.

Coating solvents for the dye recording layer are selected to minimize their effect on the substrate. Useful solvents include as alcohols, ethers, hydrocarbons, hydrocarbon halides, cellosolves, ketones. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellosolve, ethyl cellosolve, 1-methyl-2-propanol, methyl ethyl ketone, 4-hydroxy-4-methyl-2-pentanone, hexane, cyclohexane, ethylcyclohexane, octane, benzene, toluene, and xylene. Other less desirable solvents include water and dimethylsulfoxide. Preferred solvents are hydrocarbon solvents and alcohol solvents since they have the least effect on the preferred polycarbonate substrates. Mixtures of solvents can also be used.

The reflective layer can be any of the metals conventionally used for reflective layer in optical recording layers. Useful metals can be vacuum evaporated or sputtered and include gold, aluminum, copper, silver, nickel, chrome, tin and alloys comprising such metals.

Protective Layer

The compositions, from which the protective layers are prepared, are made by weighing out the specified components in brown glass bottles containing a magnetic stir bar. The compositions are then stirred overnight. The layers are formed by spin coating the compositions onto a disk substrate by applying 2 mL of solution with a 5 mL pipet. The composition is applied from the inside diameter to outside diameter while the substrate is spinning at 75–250 RPM. Excess composition is removed by spinning the substrate at 500–3000 RPM for 5–15 seconds. The layers are cured using UV curing apparatus equipped with a movable belt to transport the substrate under a UV light source. For more information on protective layers see James C. Fleming's *Optical Recording in Organic Media: Thickness Effects*, Journal of Imaging Science, Vol. 33, No. 3, May/June 1989, pages 65–68.

EXAMPLES

The following examples demonstrate the broad utility of the thioethers in improving protective layer adhesion to metal in UV-curable systems.

Comparative Example 1

A composition containing 24 weight percent Ebecryl 4881, 34 weight percent 1,6 hexanediol diacrylate (HDODA), 8 weight percent Darocur 1173, and 34 weight percent octyl/decyl acrylate (ODA) was prepared, giving comparative example 1. Ebecryl 4881 (UCB RadCure, Inc.) is an aliphatic urethane diacrylate oligomer (molecular weight 1300) diluted with 10% tetraethylene glycol diacrylate (TTEGDA). Ebecryl 4881 functions both as a physical property modifier and as a crosslinking agent in the UV-curable composition. HDODA functions as a crosslinking agent in the UV-curable composition. Octyl/decyl acrylate (ODA) or other molecules containing a single UV-curable group serve to decrease the brittleness of UV-curable coatings. Darocur 1173 is the photoinitiator.

After stirring overnight in a brown glass bottle to ensure homogenous mixing, the liquid mixture 4881-N was spin-coated onto gold-sputtered polycarbonate disks. The coatings were cured by ultraviolet (UV) radiation of 0.14 J/cm$^2$ (H lamp) to form a protective layer on gold. Adhesion of the protective layer to gold was evaluated by peel testing at 90° using the previously described procedure. Results of the peel testing of the composition were shown in Table 3. A low level of adhesion between the cured protective layer of this example and the gold is observed.

Invention Example 1

A composition containing 24 weight percent Ebecryl 4881, 34 weight percent 1,6 hexanediol diacrylate (HDODA), 8 weight percent Darocur 1173, and 34 weight percent of a thioether containing monomer of structure IV was prepared, giving invention example 1. The functions of the components in the composition are identical to those described in comparative example 1.

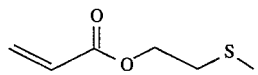

The composition was stirred overnight, coated, and cured as described in comparative example 1. Adhesion of the protective layer to gold was evaluated by peel testing at 90° using the previously described procedure. Peel testing results are shown in Table 3. The peel testing results show a significant improvement in adhesion between the cured protective layer of this example and gold compared to Comparative Example 1 that contains a hydrocarbon-containing rather than the thioether-containing molecule as the component with the single UV-curable group.

Comparative Example 2

A composition containing 24 weight percent Ebecryl 4866, 34 weight percent HDODA, 8 weight percent Darocur 1173, and 34 weight percent ODA was prepared, giving comparative example 2. Ebecryl 4866 (UCB RadCure, Inc.) is an aliphatic urethane triacrylate oligomer (molecular weight 1600) diluted with 10% tripropylene glycol diacrylate (TRPGDA). Ebecryl 4866 functions both as a physical property modifier and as a crosslinking agent in the UV-curable composition. The remaining components serve the same functions as described in comparative example 1. Adhesion of the protective layer to gold was evaluated by peel testing at 90° using the previously described procedure. Peel testing results are shown in Table 3. A low level of adhesion between the cured protective layer of this example and the gold is observed.

Invention Example 2

A composition containing 24 weight percent Ebecryl 4866, 34 weight percent 1,6 hexanediol diacrylate (HDODA), 8 weight percent Darocur 1173, and 34 weight percent of a claimed thioether containing monomer of structure IV was prepared, giving invention example 2. The functions of the components in the composition are identical to those described in comparative example 2. The composition was stirred overnight, coated, and cured as described in comparative example 1. Adhesion of the protective layer to gold was evaluated by peel testing at 90° using the previously described procedure. Peel testing results are shown in Table 3. The peel testing results show a significant improvement in adhesion between the cured protective layer of this example and gold compared to the composition of comparative example 2 that contains a hydrocarbon-containing rather than the thioether-containing molecule as the component with the single UV-curable group.

Comparative Example 3

A composition containing 24 weight percent Ebecryl 8301, 34 weight percent HDODA, 8 weight percent Darocur 1173, and 34 weight percent ODA was prepared, giving comparative example 3. Ebecryl 8301 (UCB RadCure, Inc.) is an aliphatic urethane hexacrylate oligomer (molecular weight 1000) containing an acrylated polyol diluent. Ebecryl 8301 functions both as a physical property modifier and as a crosslinking agent in the UV-curable composition. The remaining components serve the same functions as described in comparative example 1. The composition was stirred overnight, coated, and cured as described in comparative example 1. Adhesion of the protective layer to gold was evaluated by peel testing at 90° using the previously described procedure. Peel testing results are shown in Table 3. A very low level of adhesion between the cured protective layer of this example and the gold is observed.

Invention Example 3

A composition containing 24 weight percent Ebecryl 8301,34 weight percent 1,6 hexanediol diacrylate (HDODA), 8 weight percent Darocur 1173, and 34 weight percent of a thioether containing monomer of structure IV was prepared, giving invention example 3. The functions of the components in the composition are identical to those described in comparative example 3. The composition was stirred overnight, coated, and cured as described in comparative example 1. Adhesion of the protective layer to gold was evaluated by peel testing at 90° using the previously described procedure. Peel testing results are shown in Table 3. The peel testing results show a significant improvement in adhesion between the cured protective layer of this example and gold compared to comparative example 3 that contains a hydrocarbon-containing rather than the thioether-containing molecule as the component with the single UV-curable group.

Comparative Example 4

A composition containing 24 weight percent Ebecryl 600,34 weight percent HDODA, 8 weight percent Darocur 1173, and 34 weight percent ODA was prepared, giving comparative example 4. Ebecryl 600 (UCB RadCure, Inc.) is a bisphenol-A epoxy diacrylate oligomer (molecular weight 525). Ebecryl 600 functions both as a physical property modifier and as a crosslinking agent in the UV-curable composition. The remaining components serve the same functions as described in comparative example 1. The composition was stirred overnight, coated, and cured as described in comparative example 1. Adhesion of the protective layer to gold was evaluated by peel testing at 90° using the previously described procedure. Peel testing results are shown in Table 3. A low level of adhesion between the cured protective layer of this example and the gold is observed.

Invention Example 4

A composition containing 24 weight percent Ebecryl 600,34 weight percent 1,6 hexanediol diacrylate (HDODA), 8 weight percent Darocur 1173, and 34 weight percent of a thioether containing monomer of structure IV was prepared, giving invention example 4. The functions of the components in the composition are identical to those described in comparative example 4. The composition was stirred overnight, coated, and cured as described in comparative example 1. Adhesion of the protective layer to gold was evaluated by peel testing at 90° using the previously described procedure. Peel testing results are shown in Table 3. The peel testing results show a significant improvement in adhesion between the cured protective layer of this example and gold compared to comparative example 4 that contains a hydrocarbon-containing rather than the thioether-containing molecule as the component with the single UV-curable group.

Comparative Example 5

A composition containing 24 weight percent Ebecryl 3700, 34 weight percent HDODA, 8 weight percent Darocur 1173, and 34 weight percent ODA was prepared, giving comparative example 5. Ebecryl 3700 (UCB RadCure, Inc.) is a bisphenol-A epoxy diacrylate oligomer (molecular weight 525). Ebecryl 3700 functions both as a physical property modifier and as a crosslinking agent in the UV-curable composition. The remaining components serve the same functions as described in comparative example 1. The composition was stirred overnight, coated, and cured as described in comparative example 1. Adhesion of the protective layer to gold was evaluated by peel testing at 90° using the previously described procedure. Peel testing results are shown in Table 3. A low level of adhesion between the cured protective layer of this example and the gold is observed.

Invention Example 5

A composition containing 24 weight percent Ebecryl 3700, 34 weight percent 1,6 hexanediol diacrylate (HDODA), 8 weight percent Darocur 1173, and 34 weight percent of a thioether containing monomer of structure IV was prepared, giving invention example 5. The functions of the components in the composition are identical to those described in comparative example 5. The composition was stirred overnight, coated, and cured as described in comparative example 1. Adhesion of the protective layer to gold was evaluated by peel testing at 90° using the previously described procedure. Peel testing results are shown in Table 3. The peel testing results show a significant improvement in adhesion between the cured protective layer of this example and gold compared to comparative example 5 that contains a hydrocarbon-containing rather than the thioether-containing molecule as the component with the single UV-curable group.

Comparative Example 6

A composition containing 24 weight percent Ebecryl 754, 34 weight percent HDODA, 8 weight percent Darocur 1173, and 34 weight percent ODA was prepared, giving comparative example 6. Ebecryl 754 (UCB RadCure, Inc.) is an acrylic oligomer diluted with 30% HDODA. Ebecryl 754 functions both as physical property modifier and as a crosslinking agent in the UV-curable composition. The remaining components serve the same functions as described in comparative example 1. The composition was stirred overnight, coated, and cured as described in comparative example 1. Adhesion of the protective layer to gold was evaluated by peel testing at 90° using the previously described procedure. Peel testing results are shown in Table 3. A low level of adhesion between the cured protective layer of this example and the gold is observed.

Invention Example 6

A composition containing 24 weight percent Ebecryl 754, 34 weight percent 1,6 hexanediol diacrylate (HDODA), 8 weight percent Darocur 1173, and 34 weight percent of a thioether containing monomer of structure IV was prepared, giving invention example 6. The functions of the components in the composition are identical to those described in comparative Example 6. The composition was stirred overnight, coated, and cured as described in comparative Example 1. Adhesion of the protective layer to gold was evaluated by peel testing at 90° C. using the previously described procedure. Peel testing results are shown in Table 3. The peel testing results show a significant improvement in adhesion between the cured protective layer of this Example and gold compared to comparative Example 6 that contains a hydrocarbon-containing rather than the thioether-containing molecule as the component with the single UV-curable group.

Comparative Example 7

A composition containing 24 weight percent Ebecryl™ 7100. Ebecryl™ 7100 (UCB RadCure, Inc.) is an amine-functional acrylate oligomer. Ebecryl™ 7100 functions as a physical property modifier. The remaining components serve the same functions as described in comparative Example 1. The composition was stirred overnight, coated, and cured as described in comparative Example 1. Adhesion of the protective layer to gold was evaluated by peel testing at 90° C. using the previously described procedure. Peel testing results are shown in Table 3. A low level of adhesion between the cured protective layer of this Example and the gold is observed.

Invention Example 7

A composition containing 24 weight percent Ebecryl™ 7100, 34 weight percent HDODA, 8 weight percent Darocur™ 1173, and 34 weight percent of a thioether containing monomer of structure IV was prepared, giving invention example 7. The functions of the components in the composition are identical to those described in comparative Example 7. The composition was stirred overnight, coated, and, cured as described in comparative example 1. Adhesion of the protective layer to gold was evaluated by peel testing at 90° C. using the previously described procedure. Peel testing results are shown in Table 3. The peel testing results show a significant improvement in adhesion between the cured protective layer of this example and gold compared to comparative example 7 that contains a hydrocarbon-containing rather than the thioether-containing molecule as the component with the single UV-curable group.

TABLE 3

LACQUER FROM GOLD PEEL TESTING RESULTS

| Composition | Peel force (N/m) |
|---|---|
| Comparative Example 1 | 4.99 ± 0.26 |
| Invention Example 1 | 13.44 ± 0.22 |
| Comparative Example 2 | 4.15 ± 0.06 |
| Invention Example 2 | 7.08 ± 0.44 |
| Comparative Example 3 | 1.08 ± 0.04 |
| Invention Example 3 | 3.70 ± 0.17 |
| Comparative Example 4 | 3.15 ± 0.14 |
| Invention Example 4 | 5.80 ± 0.21 |
| Comparative Example 5 | 3.67 ± 0.17 |
| Invention Example 5 | 5.82 ± 0.07 |
| Comparative Example 6 | 5.54 ± 0.12 |
| Invention Example 6 | 11.31 ± 0.41 |
| Comparative Example 7 | 3.70 ± 0.15 |
| Invention Example 7 | 7.63 ± 0.28 |

Invention Example 8

To show the usefulness of the invention over a wide concentration range of thioether acrylates in the compositions of the invention, protective layers A, B, and C were prepared containing thioether containing monomer IV, N-butylacrylate (BA), HDODA, and Darocur™ 1173 in the ratios described in Table 4. HDODA serves as a crosslinker. Darocur™ 1173 serves as a photoinitiator. BA is added to maintain the ratio of thioether containing monomers containing a single UV-curable group (BA and monomer IV) to monomers containing more than one UV-curable group (HDODA) as the concentration of monomer IV is varied. Changing this ratio is one method to change the properties of the system; maintaining the ratio demonstrates that any observed changes in the behavior of the cured protective layer results from changes in component types but not number of UV-curable groups. The compositions were mixed and coated as described in comparative example 1. They were cured at a dosage of 0.25 J/cm$^2$ (H lamp). Adhesion of the protective layer to gold was evaluated by peel testing at 90° C. using the previously described procedure. Peel testing results are shown in Table 4.

TABLE 4

| Protective Layer | Monomer IV (wt %) | BA (wt %) | HDODA (wt %) | Darocur 1173 (wt %) | Peel Force (N/m) |
|---|---|---|---|---|---|
| A | 78.5 | 0 | 13.5 | 8 | >71.8 ± 12.3 |
| B | 9.6 | 67.5 | 14.9 | 8 | >143.8 ± 4.0 |
| C | 1.9 | 75.0 | 15.1 | 8 | 36.3 ± 3.3 |

Protective layers A and B adhered so strongly to the gold that they could not be peeled from the gold. In order to get an estimate of the minimum strength of their adhesion to gold, the peel strength of the tape being stripped from coatings A or B was measured. This provides an indication of the minimum peel strength of these protective layers on gold. For example, if 200 N/m is required to peel tape from the UV-cured protective layer, while leaving the protective layer adhering to the gold, it can be concluded that the protective layer/gold peel force is in excess of 200 N/m. The protective layers, D-J, detailed in Table 5 were also prepared, coated, and cured as described for protective layers A-C of this example. None of these formulations could be removed from the gold layer by the 90° peel testing method described above, giving all a peel force in excess of 50 N/m.

TABLE 5

| Protective Layer | Monomer IV (wt %) | BA (wt %) | HDODA (wt %) | Darocur 1173 (wt %) | Peel Force (N/m) |
|---|---|---|---|---|---|
| D | 4.8 | 72.2 | 15 | 8 | >50 |
| E | 6.7 | 70.3 | 15 | 8 | >50 |
| F | 9.6 | 67.5 | 14.9 | 8 | >50 |
| G | 19 | 58.3 | 14.7 | 8 | >50 |
| H | 32.6 | 45.0 | 14.4 | 8 | >50 |
| I | 45.8 | 32.1 | 14.2 | 8 | >50 |
| J | 66.6 | 11.7 | 13.7 | 8 | >50 |
| (comparative) K | 0 | 76.9 | 15.1 | 8 | 23.9 ± 2.7 |

Protective layer K, described in Table 5, was prepared, coated, and cured as described for protective layers A-C as a comparative example. Adhesion of the protective layer to gold was evaluated by peel testing at 90° using the previously described procedure. Peel testing results appear in Table 5. As can be seen, the protective layer/gold peel force found for protective layer K is significantly less than that found for protective layers A-J, demonstrating that the thioether acrylate of the invention significantly improves protective layer/gold adhesion.

The data of Tables 4 and 5 establish a thioether acrylate range of at least 0.5 to 95 weight percent. The remainder of the composition may comprise at least 2 weight percent of the molecule containing more than one UV-curable group and at least 0.25 weight percent photoinitiator.

Invention Example 9

The structure of the thioether acrylate may also be varies within the scope of this invention. This is demonstrated in the this example.

The formulations of this example, with one exception, consisted of 24 weight percent Ebecryl 754, 34 weight percent ODA, 8 weight percent Darocur 1173, and 34 weight percent of the monomers listed in Table 6. The exception is composition 754-26S contained 24 weight percent Ebecryl 754, 34 weight percent HDODA, 8 weight percent Darocur 1173, and 34 weight percent of the monomer listed in Table 6. Ebecryl 754, ODA, HDODA, and Darocur 1173 serve the functions listed in previous examples. The composition labels and the structures of the monomers of this invention that are demonstrated in the present example are shown in Table 6. The formulations were prepared, coated, and cured as described in comparative example 1. Adhesion of the protective layer to gold was evaluated by peel testing at 90° using the previously described procedure. Peel testing results are shown in Table 6.

The peel testing data in Table 6 shows that the peel force of a cured protective layer containing no thioether acrylate (754-11N) had a low protective layer/gold peel force. Every cured protective layer containing a thioether acrylate (L, M, N, O, P, Q, and R) exhibited a significant improvement in protective layer/gold peel force compared to the cured protective layer containing no thioether acrylate (comparative layer L), demonstrating that the structure of the thioether acrylate is not limited to monomer structure IV.

TABLE 6

Peel Testing Results For S-Containing Acrylates Of Varying Structures

| Layer | Monofunctional Acrylate | Peel Force (N/m) |
|---|---|---|
| Comparative layer L | ODA | 5.3 ± 0.2 |
| L | [structure: H₂C=CH-C(=O)-O-CH₂CH₂-S-CH₃] | 14.8 ± 0.3 |
| M | [structure: H₂C=CH-C(=O)-O-CH₂CH₂-CH(SCH₃)-CH₂-CH₃] | 7.0 ± 0.3 |
| N | [structure with H₂C=CH-C(=O)-O-CH₂-C(=CH₂)-... with S and N substituents] | 11.4 ± 0.7 |
| O | [structure: H₂C=CH-C(=O)-NH-CH₂CH₂CH₂-S-CH₃] | 7.5 ± 0.2 |
| P | [structure: H₂C=CH-C(=O)-O-CH₂-C₆H₄-S-CH₃] | 6.3 ± 0.2 |
| Q | [structure: H₂C=CH-C(=O)-O-CH₂-S-CH₂CH₃] | 16.5 ± 0.7 |
| R | [structure: H₂C=CH-C(=O)-O-CH₂-CH(S-CH₃)-CH₂-O-C(=O)-CH=CH₂] | 6.4 ± 0.2 |

The invention has been described in detail with particular reference to preferred embodiments thereof, but it will be understood that variations and modifications can be effected within the spirit and scope of the invention.

We claim:

1. An optical recording element comprising a protective layer wherein the protective layer is formed from a photopolymerized composition comprising a crosslinking agent, a UV sensitive photopolymerization initiator and a thioether acrylate having the structure:

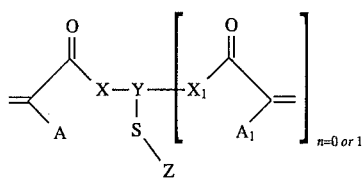

A and $A_1$, each independently, represent H or branched or straight-chain $C_1$-$C_{10}$ alkyl;

X and $X_1$, each independently, represent NH or O;

X and $X_1$, each independently, represent NH or O;

Y represents a branched or straight-chain $C_1$-$C_{20}$ alkylene, alkenylene or alkynylene; $C_6$-$C_{30}$ aromatic groups or heterocyclic having 5 to 30 atoms;

S is a sulfur atom; and

Z represents a branched or straight-chain $C_1$-$C_{20}$ alkyl, alkenyl or alkynyl; $C_6$-$C_{30}$ aromatic groups or heterocyclic having 5 to 30 atoms; or Y, S and Z may be taken together to form a heterocylic group containing from 5 to 8 atoms.

2. The element of claim 1 wherein A and $A_1$, each independently represent hydrogen, methyl, ethyl, propyl or butyl;

Y represents methylene; ethylene; propylene; 1-methyl pentylene; 1,2-dimethyloctylene; 1,1-dimethylpropylene; 2-methlethylene; 4,4-dimethybutylene; hexylene; 2-ethylethylene; 3-butylpropylene; 5,5-butylhexylpentylene; 1,1-ethylbutylhexadecylene; methylenecyclobutylene; propylene-1,3-cyclopentylene; methylene-1,4-cyclohexylene; propylene-1,3-cyclohexylene; 21-trieicosynylene; 4,5-heptadienylene; 1-(-2-hexenyl)propylene; 3-3-(cyclohex-3-enyl)propylpropylene; pentadecylene; 3-2-(m-ethylphenyl)ethylhexylene; hexylene-1,4-phenyleneethylene; butylene; methylene-1,7-naphthylenepropylene; methylene-1,3-pyridenyleneethylene; eicosanylene; 2,5-thiophenylene; 2-pentenylene; 4-methyl-5-decylhept-4-enylene; dodecylene; 8,11,14,17,20-pentaoxodoeicosanylene; and 9-isobornyldecylene;

Z represents methyl; ethyl; propyl; butyl; pentyl; 1,1-dimethylpropyl; 2-methylpropyl; cycloheptyl; 5-cyclohexylpentylene; 3-butylcyclopentyl; methylene-2-propylcyclohexyl; 21-cycloundecyltrieicosyl; cyclohexyl; 2,6,10,14,18,22,26,30,34,38-tetraminoditetracontyl; 3-decenyl; z-3-methyl-4-ethyltetradec-3-enyl; 5-heptynyl; 3-butynyl; 2-pentenyl; 1-ethyl-3-dicyclopentadieneproplene; 3-hexyl-4-isopropylphenylenebutylene; phenylpropylene; methylenenathphyl; dodecyl; methylene-2,5-pyridenylenepropyl; 4-pyridenylbutylene; 2-furanylethylene; methylene-2,5-pyrrolylenepropyl; 3-butenylene; 2-propyl-prop-2-enyl; 2-hexahydroindanylethylene; or Y, Z and S, taken together represent methylene-1,2-(4-sulfacyclopentylenepropyl; propylene-4-sulfacyclooctyl; methylene-4-sulfa-2-aminocyclopentyl; 2-sulfa-5-oxocycloheptane; ethylene-1,3-(2-oxo-3-sulfa)cylohexylenehexane; methylene-1,5-(3-sulfa-6-aminocyloocylene)propane; heptylene-4-sulfacylcopent-1-ene; methylene-4-sulfa-2-aminocyclopent-1-ene; propylene-1,2-(4-sulfacyclopent-1-ene)ethane.

3. The element of claim 1 wherein the thioether acrylate is selected from Tables 1 and 2 as follows:

TABLE 1 n = 0

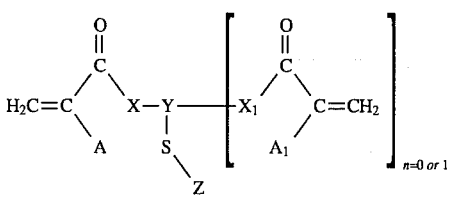

No.

(1)

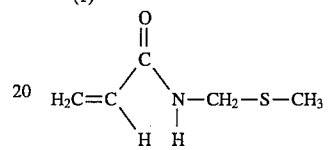

(2)

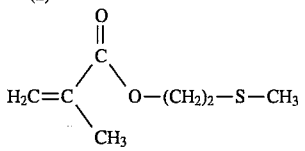

(3)

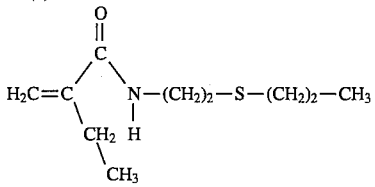

(4)

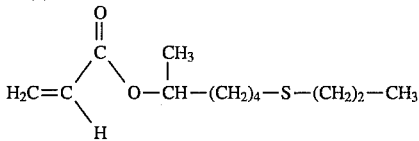

(5)

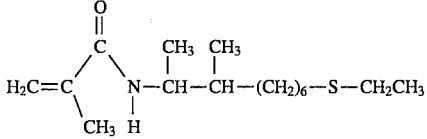

(6)

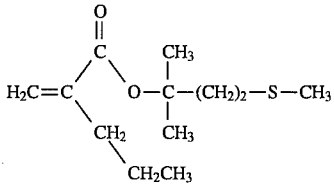

(7)

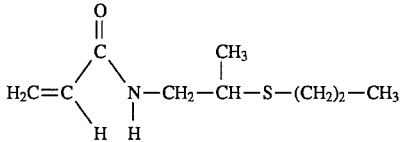

TABLE 1-continued
n = 0
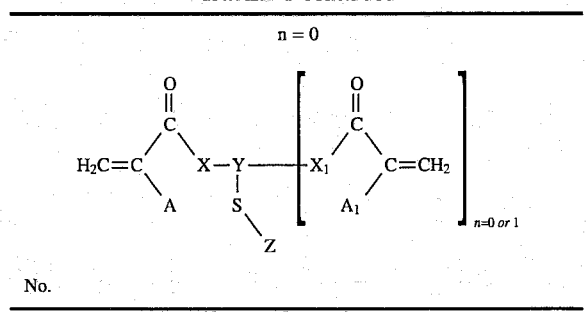
No.
(8)
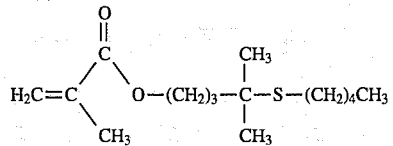
(9)
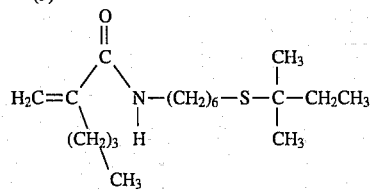
(10)
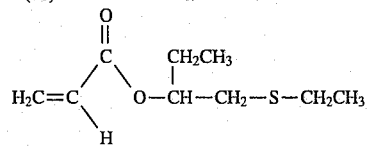
(11)
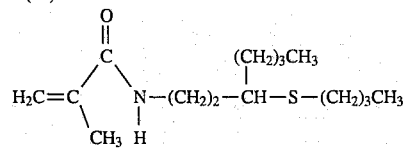
(12)
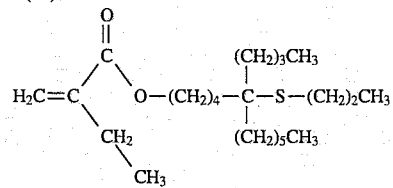
(13)
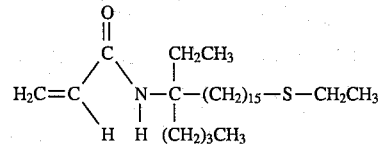
(14)
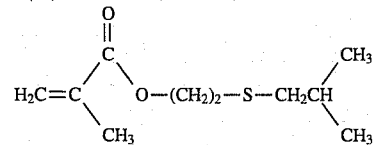
TABLE 1-continued
n = 0
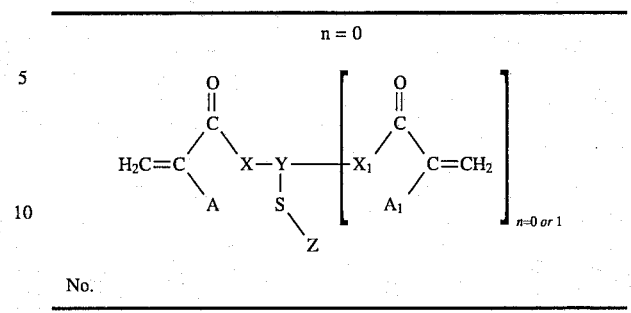
No.
(15)
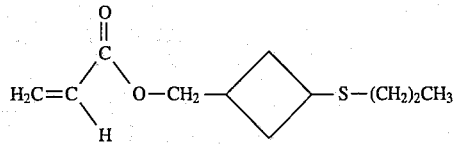
(16)
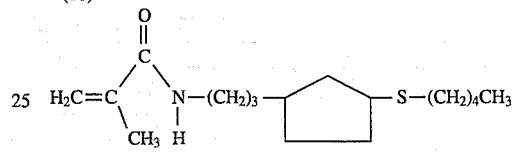
(17)
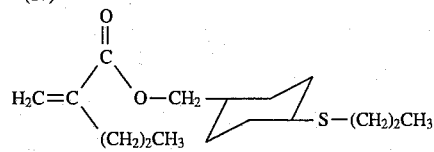
(18)
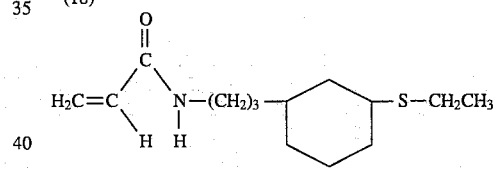
(19)
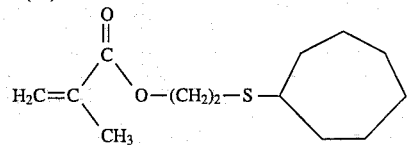
(20)
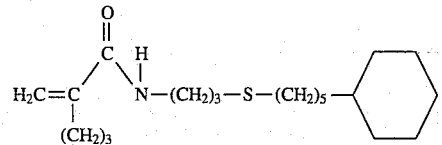
(21)
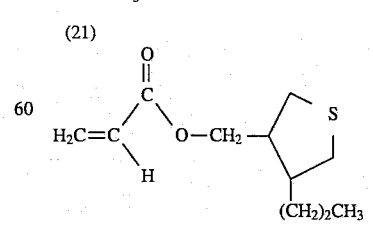

TABLE 1-continued n = 0

$$\text{H}_2\text{C}=\text{C}(\text{A})-\text{C}(=\text{O})-\text{X}-\text{Y}(-\text{S}-\text{Z})-[\text{X}_1-\text{C}(\text{A}_1)(=\text{CH}_2)-\text{C}(=\text{O})]_{n=0\text{ or }1}$$

No.

(22) H₂C=CH—C(=O)—O—(CH₂)₂—S—cyclopentyl(—(CH₂)₃CH₃)

(23) H₂C=C(—(CH₂)₂CH₃)—C(=O)—NH—(CH₂)₁₅—S—CH₂—cyclohexyl(—(CH₂)₂CH₃)

(24) H₂C=C(CH₃)—C(=O)—O—(CH₂)₃—(thiocane with S)

(25) H₂C=CH—C(=O)—NH—(CH₂)₈—CH(—norbornyl)—CH₂—S—(CH₂)₂CH₃

(26) H₂C=C(—(CH₂)₃CH₃)—C(=O)—O—(CH₂)₃—S—(CH₂)₂₀—CH(cycloundecyl-11)—CH₂CH₃

(27) H₂C=C(CH₃)—C(=O)—NH—(CH₂)₂—S—(CH₂)₂—(decahydroindenyl)

(28) H₂C=CH—C(=O)—O—(CH₂)₃—S—cyclooctyl

(29) H₂C=CH—C(=O)—NH—CH₂—CH(thiazolidine ring)

(30) H₂C=C(CH₃)—C(=O)—O—(1,4-oxathiepane ring)

(31) H₂C=C(—CH₂CH(CH₃)—)—C(=O)—NH—(CH₂)₂—(1,3-oxathiane with —(CH₂)₅CH₃)

(32) H₂C=C(—(CH₂)₃CH₃)—C(=O)—O—CH₂—(thiazocane with —(CH₂)₂CH₃, NH)

(33) H₂C=C(CH₃)—C(=O)—NH—(CH₂)₇—[O—(CH₂)₂]₅—S—CH₂CH₃

(34) H₂C=C(—CH₂CH₃)—C(=O)—O—(CH₂)₂—S—CH₂—[NH—(CH₂)₃]₁₀—CH₃

TABLE 1-continued
n = 0
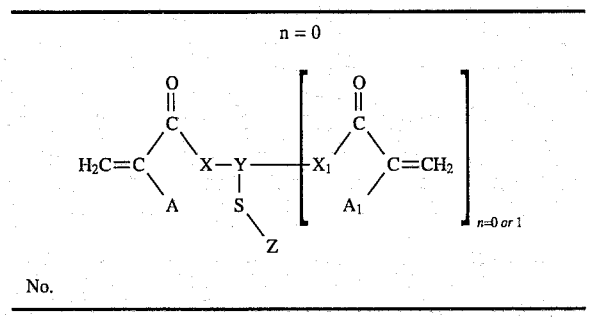
No.
(35) 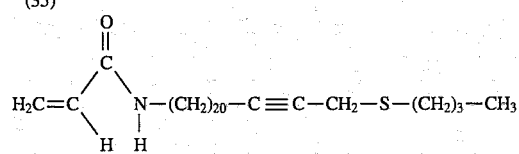
(36) 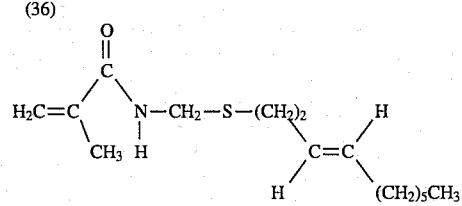
(37) 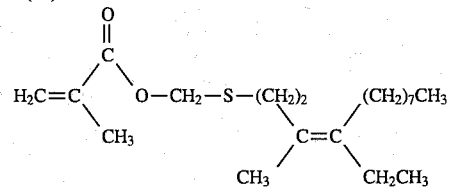
(38) 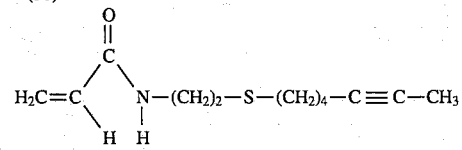
(39) 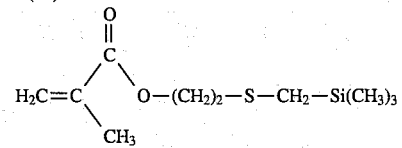
(40) 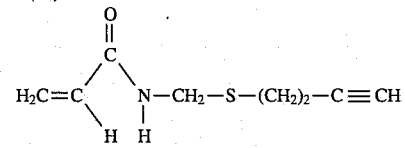
(41) 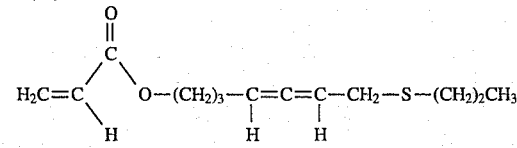
TABLE 1-continued
n = 0
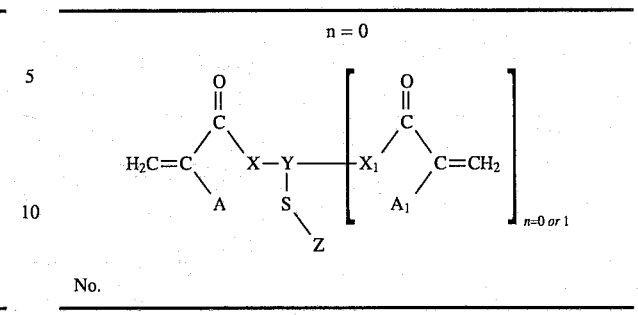
No.
(42) 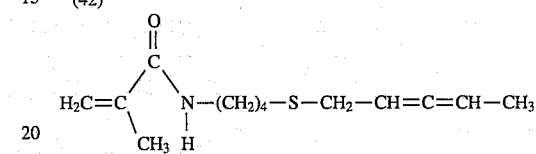
(43) 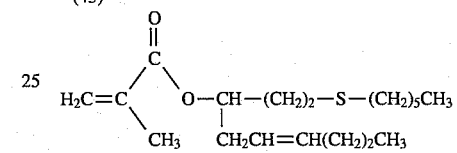
(44) 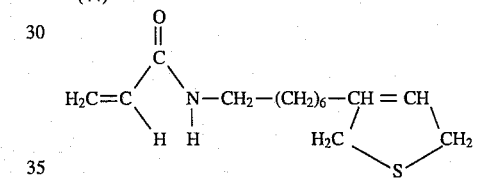
(45) 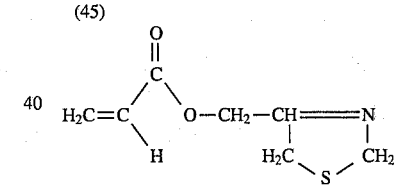
(46) 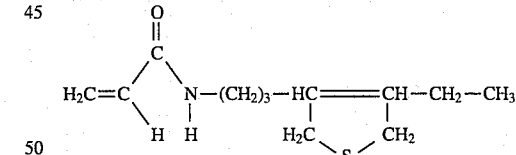
(47) 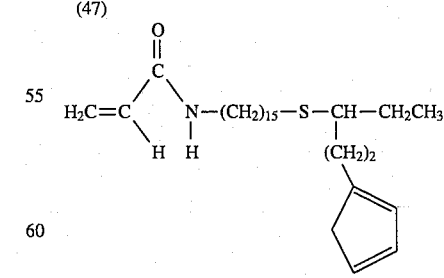

TABLE 1-continued
n = 0
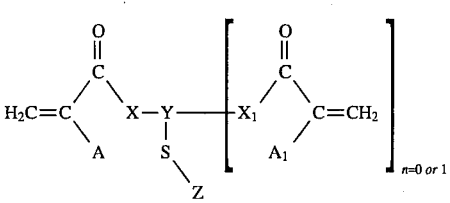
| No. |
|---|
| (48) 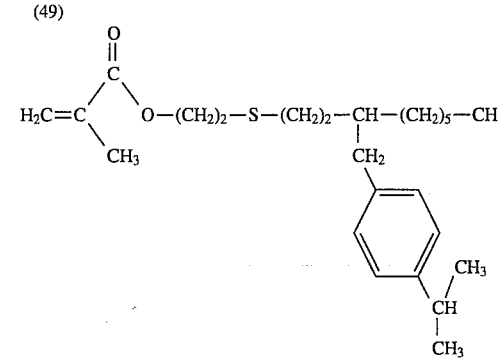 |
| (49) 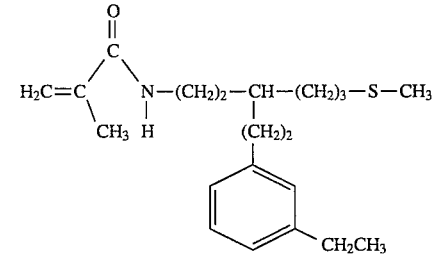 |
| (50) 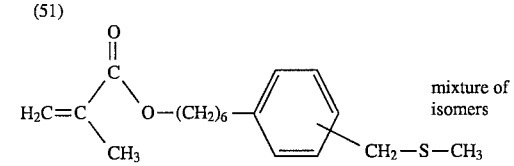 |
| (51) 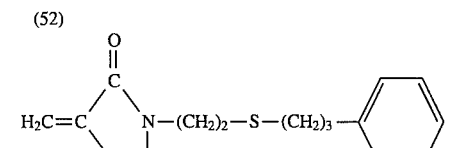 mixture of isomers |
| (52) 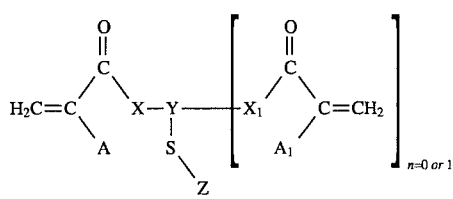 |
TABLE 1-continued
n = 0
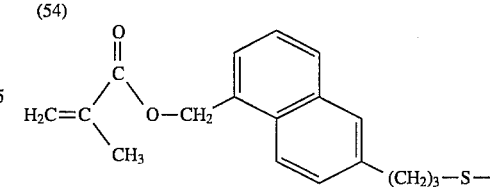
| No. |
|---|
| (53) 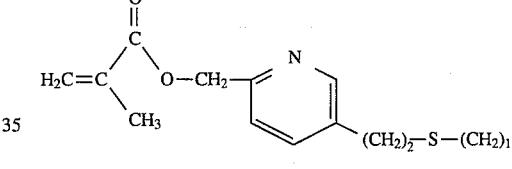 |
| (54) 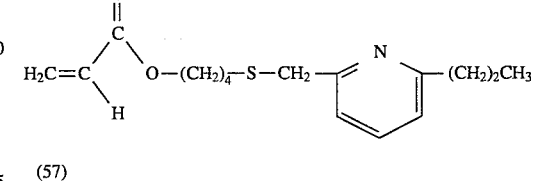 |
| (55) 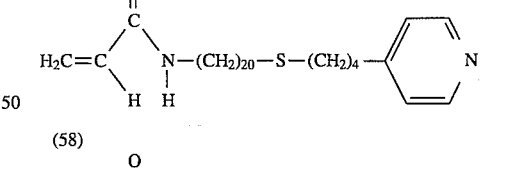 |
| (56) 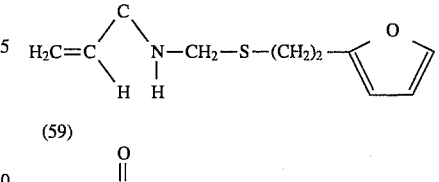 |
| (57) 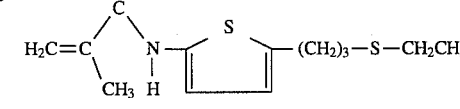 |
| (58) |
| (59) |

TABLE 1-continued
n = 0
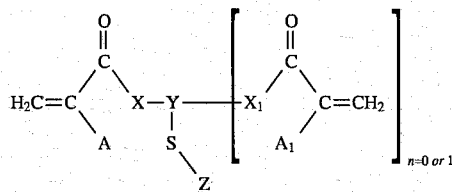
| No. | |
|---|---|
| (60) | 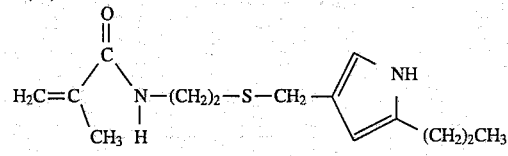 |
| (61) | 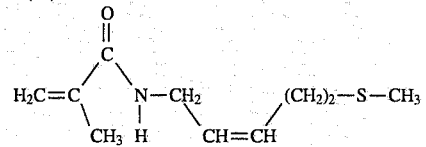 |
| (62) | 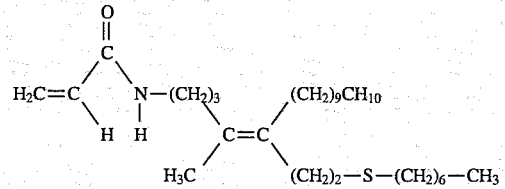 |
TABLE 1-continued
n = 0
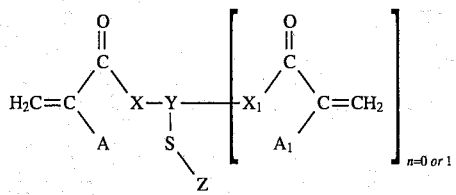
| No. | |
|---|---|
| (63) | 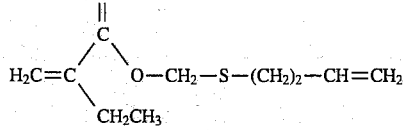 |
| (64) | 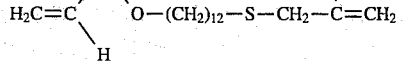 |
TABLE 2
n = 1
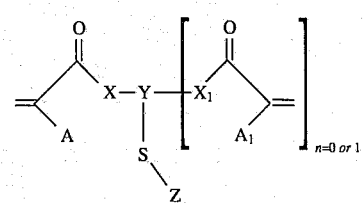
| | A | A' | X | X' | Y | Z |
|---|---|---|---|---|---|---|
| II-1 | H | H | O | O | —CH$_2$—CH—CH$_2$— | —CH$_3$ |
| II-2 | CH$_3$ | CH$_3$ | NH | NH | —CH$_2$—C(CH$_3$)(CH$_2$CH$_2$)—CH$_2$—CH$_2$— | —CH$_3$ |
| II-3 | CH$_2$CH$_3$ | CH$_2$CH$_3$ | O | NH | —CH$_2$—CH$_2$—C(OCH$_3$)—CH$_2$— | —CH$_3$ |

TABLE 2-continued
$$n = 1$$
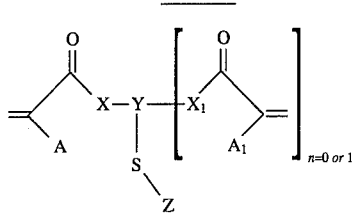
| | A | A' | X | X' | Y | Z |
|---|---|---|---|---|---|---|
| II-4 | H | H | NH | O | 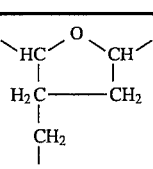 | —CH$_3$ |
| II-5 | CH$_3$ | CH$_3$ | O | O | 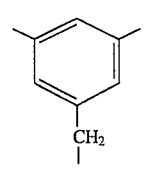 | —CH$_3$ |
| II-6 | CH$_2$CH$_3$ | CH$_2$CH$_3$ | NH | NH | 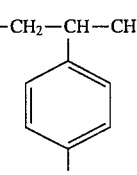 | —CH$_3$ |
| II-7 | H | H | O | NH | —CH$_2$—CH—CH$_2$— | 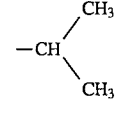 |
| II-8 | CH$_3$ | CH$_3$ | NH | O | 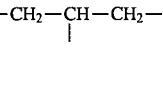 | 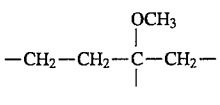 |
| II-9 | CH$_2$CH$_3$ | CH$_2$CH$_3$ | O | O | 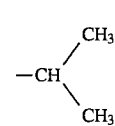 | 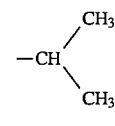 |
| II-10 | H | H | NH | NH | 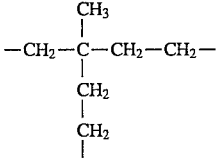 | 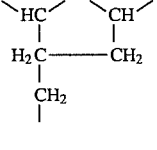 |
| II-11 | CH$_3$ | CH$_3$ | O | NH | 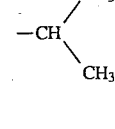 | 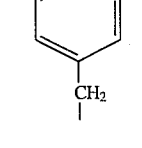 |

TABLE 2-continued n = 1

$$\begin{array}{c} O \\ \| \\ =\!\!\overset{A}{C}\!\!-\!\!X\!\!-\!\!Y\!\!-\!\!\left[\overset{O}{\underset{A_1}{\overset{\|}{C}}}\!\!-\!\!X_1\right]_{n=0 \text{ or } 1} \\ \underset{Z}{|} \\ S \end{array} \qquad I$$

| | A | A' | X | X' | Y | Z |
|---|---|---|---|---|---|---|
| II-12 | CH₂CH₃ | CH₂CH₃ | NH | O | —CH₂—C₆H₄—CH₂— (para) | —CH(CH₃)₂ |
| II-13 | H | H | O | O | —CH₂—CH(—)—CH₂— | 3,5-dimethylphenyl |
| II-14 | CH₃ | CH₃ | NH | NH | —CH₂—C(CH₃)(CH₂CH₂—)—CH₂—CH₂— | 3,5-dimethylphenyl |
| II-15 | CH₂CH₃ | CH₂CH₃ | O | NH | —CH₂—CH₂—C(OCH₃)(—)—CH₂— | 3,5-dimethylphenyl |
| II-16 | H | H | NH | O | tetrahydrofuran-2,3,4-triyl-CH₂— | 3,5-dimethylphenyl |
| II-17 | CH₃ | CH₃ | O | O | 1,3,5-C₆H₃(CH₂—)(—)(—) | 3,5-dimethylphenyl |
| II-18 | CH₂CH₃ | CH₂CH₃ | NH | NH | —CH₂—C₆H₄—CH₂— (para) | 3,5-dimethylphenyl |
| II-19 | H | H | O | NH | —CH₂—CH(—)—CH₂— | —CH₂—CH₂—SO₃H |

TABLE 2-continued $$\underset{A}{\overset{O}{\underset{\underset{S}{|}}{\parallel}}}\text{—X—Y}\underbrace{\left[\overset{O}{\underset{A_1}{\overset{\parallel}{\text{—X}_1}}}\right]_{n=0\,or\,1}}_{n=1}\quad\text{I}$$

| | A | A' | X | X' | Y | Z |
|---|---|---|---|---|---|---|
| II-20 | $CH_3$ | $CH_3$ | NH | O | $-CH_2-\underset{\underset{CH_2}{\underset{CH_2}{\mid}}}{\overset{CH_3}{\underset{\mid}{C}}}-CH_2-CH_2-$ | $-CH_2-CH_2-SO_3H$ |
| II-21 | $CH_2CH_3$ | $CH_2CH_3$ | O | O | $-CH_2-CH_2-\underset{\mid}{\overset{OCH_3}{\underset{\mid}{C}}}-CH_2-$ | $-CH_2-CH_2-SO_3H$ |
| II-22 | H | H | NH | NH | tetrahydrofuran ring with $-CH_2-$ substituent | $-CH_2-CH_2-SO_3H$ |
| II-23 | $CH_3$ | $CH_3$ | O | NH | 1,3,5-trisubstituted benzene with $-CH_2-$ | $-CH_2-CH_2-SO_3H$ |
| II-24 | $CH_2CH_3$ | $CH_2CH_3$ | NH | O | $-CH_2-CH-CH_2-$ with p-phenylene | $-CH_2-CH_2-SO_3H$ |
| II-25 | H | H | O | O | $-CH_2-CH-CH_2-$ | cyclohexyl |
| II-26 | $CH_3$ | $CH_3$ | NH | NH | $-CH_2-\underset{\underset{CH_2}{\underset{CH_2}{\mid}}}{\overset{CH_3}{\underset{\mid}{C}}}-CH_2-CH_2-$ | cyclohexyl |
| II-27 | $CH_2CH_3$ | $CH_2CH_3$ | O | NH | $-CH_2-CH_2-\underset{\mid}{\overset{OCH_3}{\underset{\mid}{C}}}-CH_2-$ | cyclohexyl |

TABLE 2-continued
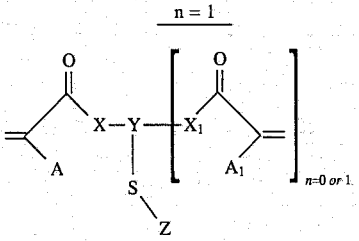

TABLE 2-continued

| | A | A' | X | X' | Y | Z |
|---|---|---|---|---|---|---|
| II-36 | CH$_2$CH$_3$ | CH$_2$CH$_3$ | NH | O | —CH$_2$—CH—CH$_2$— (with p-phenylene) | (thiophene-S) |

4. The element of claim 1 wherein the thioether acrylate is selected from 2-(methylthio)ethylacrylate, 3-(methylthio)hexylacrylate, 4-methyl-5-thiazololethylacrylate, 3-(methylthio)propylacrylate, p-methylthiobenzylacrylate, 2-(ethylthio)ethylacrylate, and 1-(methylthio)methylethanedioldiacrylate.

5. The element of claim 1 comprising from 0.25 to 25 weight percent photo-polymerization initiator; from 2 to 95 weight percent crosslinking agent and 0.5 to 95 weight percent of the thioether compound.

6. The element of claim 5 comprising from 0.25 to 25 weight percent photopolymerization initiator; and 0.5 to 99 weight percent of the thioether compound.

7. The element of claim 6 wherein comprising from 1 to 10 weight percent photopolymerization initiator; from 2 to 50 weight percent crosslinking agent and 2 to 80 weight percent of the thioether compound.

8. The element of claim 1 wherein the the protective layer resides on a metal reflective layer wherein the metal is selected from the group consisting of antimony, indium, gold, aluminum, copper, silver, nickel, chrome, titanium, cobalt, palladium, tin and alloys comprising such metals.

9. The element of claim 8 wherein the metal is gold.

10. The element of claim 9 wherein the optical recording element is a compact disk.

11. The element of claim 1 wherein the optical recording element is a phase change element or a magneto optic element.

* * * * *